(12) United States Patent
Deckenbach et al.

(10) Patent No.: US 9,460,579 B2
(45) Date of Patent: Oct. 4, 2016

(54) SENSOR FOR CHECKING VALUE DOCUMENTS

(71) Applicant: GIESECKE & DEVRIENT GMBH, Munich (DE)

(72) Inventors: Wolfgang Deckenbach, Schechen (DE); Achim Philipp, Munich (DE); Hans-Peter Ehrl, Wolfratshausen (DE)

(73) Assignee: GIESECKE & DEVRIENT GMBH, Munich (DE)

(*) Notice: Subject to any disclaimer, the term of this patent is extended or adjusted under 35 U.S.C. 154(b) by 205 days.

(21) Appl. No.: 14/356,341

(22) PCT Filed: Oct. 31, 2012

(86) PCT No.: PCT/EP2012/004548
§ 371 (c)(1),
(2) Date: May 5, 2014

(87) PCT Pub. No.: WO2013/064245
PCT Pub. Date: May 10, 2013

(65) Prior Publication Data
US 2014/0293271 A1    Oct. 2, 2014

(30) Foreign Application Priority Data

Nov. 4, 2011  (DE) .................. 10 2011 117 678

(51) Int. Cl.
*G07D 7/12* (2016.01)
*G01J 3/28* (2006.01)
(Continued)

(52) U.S. Cl.
CPC ............. *G07D 7/122* (2013.01); *G01J 3/0208* (2013.01); *G01J 3/2803* (2013.01); *G01J 3/36* (2013.01); *G01J 3/51* (2013.01); *G06K 5/00* (2013.01)

(58) Field of Classification Search
None
See application file for complete search history.

(56) References Cited

U.S. PATENT DOCUMENTS 4,452,843 A * 6/1984 Kaule .................... B41M 3/144
                                                    101/DIG. 46
5,982,497 A    11/1999 Hopkins
(Continued)

FOREIGN PATENT DOCUMENTS

CN    1266485 A    9/2000
EP    1898365 A1    3/2008

OTHER PUBLICATIONS

Search Report from German Application No. DE 10 2011 117 678.4, Jul. 16, 2012.
(Continued)

*Primary Examiner* — Kara E Geisel
*Assistant Examiner* — Amanda Merlino
(74) *Attorney, Agent, or Firm* — Workman Nydegger

(57) ABSTRACT

The invention relates to a sensor for checking value documents with a detection device having at least two photodetectors through which the detection light of the value document is detectable in at least two different spectral regions. The detection device contains a collecting optic common to the photodetectors, through which the detection light emitted by the value document in a detection region can be collimated to a light beam. Each of the photodetectors has associated therewith a detector lens which receives a partial light beam of the light beam collimated by the collecting optic and directs it onto the respective photodetector, so that the detection region substantially coincides for the different photodetectors. By the sensor there can be detected different spectral portions of the detection light of the same detection region separately from each other at the same point in time.

15 Claims, 4 Drawing Sheets

(51) Int. Cl.
  *G01J 3/36* (2006.01)
  *G01J 3/51* (2006.01)
  *G01J 3/02* (2006.01)
  *G06K 5/00* (2006.01)

(56) References Cited

U.S. PATENT DOCUMENTS 6,024,202 A 2/2000 Potter
2008/0048106 A1 2/2008 Blanchard et al.

2011/0187095 A1 8/2011 Anouar

OTHER PUBLICATIONS

Search Report from Chinese Application No. CN 2012800522231, Apr. 16, 2015.
International Preliminary Report on Patentability for corresponding International PCT Application No. PCT/EP2012/004548, issued May 6, 2014.
International Search Report for corresponding International PCT Application No. PCT/EP2012/004548, mailed Feb. 6, 2013.

* cited by examiner

D - D

SENSOR FOR CHECKING VALUE DOCUMENTS

BACKGROUND

This invention relates to a sensor for checking value documents and to an apparatus for checking value documents which has the sensor.

SUMMARY

For checking value documents there are usually employed sensors with which the type of the value documents is determined or with which the value documents are checked for authenticity or for their state. Such sensors are employed for checking value documents, such as e.g. bank notes, checks, identity cards, credit cards, check cards, tickets, vouchers and the like. The check of the value documents is effected in an apparatus for value-document processing in which there are contained one or several different sensors, depending on the value-document properties to be checked. Upon checking, the value documents are usually scanned in one or several tracks, whereby the sensor and the value document are moved relative to each other.

The value documents are frequently checked with the aid of optical sensors which capture the light emanating from the respective value document. To obtain spectral information about the value document to be checked, the light emanating from an illuminated value document is detected with the aid of several photodetectors which detect different spectral portions of the light. When several photodetectors are arranged laterally offset from each other after a common detection optic, as it is described e.g. in U.S. Pat. No. 6,024,202, they detect detection light emanating from different detection regions on the value document to be checked. In the case of image sensors, the different detection regions of photodetectors laterally offset from each other are deliberately exploited to obtain a locally resolved image of the detected object.

To exclude this lateral offset of the different spectral portions, it is known to install in the optical construction of the detection ray path a diffraction grating or partly transmissive beam splitters through which different portions of the light emitted by the value document are directed onto different photodetectors. However, an optical construction with a diffraction grating or with beam splitters requires considerable installation space.

Hitherto the measuring inaccuracy arising from a lateral offset of the detection regions of photodetectors arranged side by side has either been accepted or subsequently removed in the detected signals. The subsequent removal can be carried out e.g., as in U.S. Pat. No. 6,024,202, with the aid of a targeted time delay between the signals detected by the photodetectors. Other sensors compensate the lateral offset, after the conversion of the optical signals to electronic signals, by superimposing over each other the electronic signals obtained for the different spectral portions. In the case of time-varying optical signals, however, a correction of the offset cannot be obtained simply by subsequently superimposing the detected signals. Because due to the temporal signal change a corresponding correction would be very complex, and its computation would be dependent on the respective application, in particular on the value document to be checked.

It is therefore an object of the present invention to state a sensor for checking value documents which has a compact construction, which can detect different spectral portions of the detection light separately from each other at the same point in time, and wherein the detection regions in which the different spectral portions are detected at the same point in time coincide substantially with each other.

This object is achieved by the subject matters of the independent claims. In claims dependent thereon there are stated advantageous developments and embodiments of the invention.

This object is achieved by a sensor for checking value documents which is configured for checking a value document present in a measuring plane of the sensor. For checking a value document, the value document is brought into the measuring plane, in particular into a capture region of the sensor that is situated in the measuring plane. The sensor has at least one light source for illuminating the value document to be checked by the sensor, and at least one detection device. The detection device is configured for detecting light emanating from the illuminated region when the value document is illuminated upon operation of the sensor.

The detection device has at least two photodetectors arranged side by side which are configured for detecting detection light which emanates from the value document in a detection region of the measuring plane due to the illumination with the light source upon checking of the value document, and is propagated along the detection ray path to the photodetectors. The detection light of the value document is detectable by the photodetectors in at least two different spectral regions. This means that at least one of the photodetectors of the detection device detects a different spectral portion of the detection light emanating from the illuminated region compared to the other photodetectors of the detection device. For example, each of the photodetectors is configured for detecting a different spectral portion of the detection light compared to the other photodetectors of the detection device.

The sensor further has a collecting optic common to the photodetectors, through which the detection light emitted by the value document in the detection region can be collected and collimated to a light beam. The collecting optic is arranged such that it collects the detection light of the value document emitted perpendicularly to the value-document plane and the detection light emitted in an angle range around the perpendicular. The collecting optic is formed e.g. by one or several refractive optical elements and/or diffractive optical elements. Preferably, the collecting optic is formed by one or several collecting lenses. Viewed along the optical axis of the detection ray path, the photodetectors are arranged after the collecting optic. In addition to the collecting optic, each of the photodetectors has associated therewith a detector lens which is arranged after the collecting optic and before the respective photodetector, viewed along the optical axis of the detection ray path. The optical axis of the collecting optic is designated as the optical axis of the detection ray path, the direction designated as "along the optical axis of the detection ray path" referring to the direction of propagation of the detection light from the detection region to the collecting optic.

The detector lenses are arranged side by side such that each detector lens receives a partial light beam of the light beam collimated by the collecting optic and directs it onto the respective photodetector, so that the detection region whose detection light is detectable at the same point in time by the photodetectors substantially coincides for the different photodetectors. "Substantially coincident detection regions" is understood to mean an overlap of surface area of the detection regions of the photodetectors of at least 50%, preferably of at least 80%.

In contrast to the above-mentioned prior art, the photo detectors do thus not detect detection regions that are separate from each other and located side by side on the value document. Rather, it is achieved by the arrangement according to the invention of the collecting optic, the detector lenses and the photodetectors that the detection light detected by the photodetectors stems from a substantially coincident detection region of the value document present in the measuring plane. In this way there is realized a sensor that can detect different spectral portions of the detection light emanating from this detection region at the same point in time and that nevertheless has a compact optical construction.

By the arrangement according to the invention it is achieved that the different spectral portions of the detection light that are detected by the photodetectors stem from substantially the same detection region. Since the location and extension of the detection region of the individual photodetectors are substantially coincident, it becomes possible to verify more exactly the local value-document properties, e.g. authentication features. Because when the intensities detected in different spectral regions are correlated with each other, e.g. for a proof of authenticity, this is effected with a greater local coincidence than hitherto. Moreover, a detection of several spectral portions of the detection light at the same detection site in time synchronism is made possible. A subsequent correction of the lateral offset is unnecessary.

The detector lenses are arranged side by side in the detection ray path such that the light beam collimated by the collecting optic is divided laterally by the detector lenses into at least two partial light beams. And they are arranged such that the partial light beams are directed by the respective detector lens onto the respective photodetector. The partial light beams are partial beams of the collimated light beam which are formed by geometrical division from the collimated light beam. That is, the partial light beams arise from the collimated light beam without ray deflection and without a change of direction, i.e. without any interjacent beam splitters, dispersion elements, etc. The geometrical division of the light beam into the partial beams can be supported by shielding screens which are arranged between the detector lenses (before and/or after the detector lenses, viewed along the optical axis of the detection ray path).

To obtain a lateral division of the detection light onto the detector lenses, the optical axes of the detector lenses are respectively arranged outside the optical axis of the detection ray path. Preferably, the optical axes of the detector lenses have the same lateral distance from the optical axis of the detection ray path for at least two or for all detector lenses. In particular, the arrangement of the photodetectors and of the appurtenant detector lenses is such that the center of the two arrangements, in particular their axis of symmetry or their center of symmetry, lies substantially on the optical axis of the detection ray path.

Preferably, the collecting optic, the detector lenses and the photodetectors are arranged relative to each other, and in relation to the measuring plane, such that the detection regions whose detection light is detected by the photodetectors at the same point in time are congruent for the different photo detectors. To achieve a congruent detection region, the optical axes of the detector lenses are preferably oriented parallel to the optical axis of the detection ray path and offset laterally therefrom. Moreover, the photodetectors are preferably arranged on the optical axis of the respective detector lens. The lateral distance of the photodetectors from the optical axis of the detection ray path is e.g. equally large for at least two or for all photodetectors.

In particular, the arrangement of the detector lenses can be chosen such that the light beam collimated by the collecting optic is divided laterally by the detector lenses into at least two partial light beams uniformly, i.e. the partial light beams contain equally large intensity portions of the detection light. The uniform division of the collimated light beam into the partial light beams also includes the case of an intensity portion of the collimated light beam being employed for an additional photodetector, or intensity portions being lost upon the division. Apart from a different spectral filtering of the detection light, the uniform division of the collimated light beam into the partial light beams permits the detection light of each point of the detection region to be divided onto the photodetectors uniformly, i.e. the photodetectors of the detection device to obtain equally large intensity portions of the detection light. It is thus achieved that the spectrally separate detection is respectively based on the same portion of the detection light. The detected intensities can thus be even better compared with each other and can be simply correlated with each other.

The detector lenses are preferably arranged directly after the collecting optic along the optical axis of the detection ray path. Preferably, the detector lenses are arranged coplanarly in a plane lying parallel to the measuring plane of the value document. In particular, the detector lenses are fastened side by side on a common carrier. For example, all detector lenses are identically configured, in particular with identical form and/or identical focal length. Alternatively, some detector lenses can also have a different form and/or focal length. The detector lenses are preferably single lenses configured to be separate from each other. Preferably, the detector lenses are received individually in a common light-non-transmissive mount, so that at this place—even when detection light is directionally deflected e.g. through light scattering—no detection light can impinge on a different one of the photodetectors than intended, i.e. in order that no crosstalk to a different one of the detected spectral regions can take place.

The detector lenses and the photodetectors are arranged relative to each other such that each of the photodetectors has a detector lens associated therewith. The photodetectors of the detection device are also preferably arranged coplanarly in a plane lying parallel to the measuring plane of the value document. Preferably, the photodetectors are arranged side by side on a receiving means common to the photodetectors. The receiving means has e.g. a multiplicity of positions which are respectively configured for receiving a photodetector member or a chip-shaped photodetector. To obtain a unique association between the detector lenses and the photodetectors, the photodetectors are so arranged on the receiving means that their arrangement corresponds to the arrangement of the detector lenses. Preferably, the photodetectors and the respective detector lens of the photodetector are arranged relative to each other such that each photodetector is arranged approximately at the focal point of the detector lens associated therewith.

The collecting optic is preferably arranged such that the detection light of the value document emitted by each detection site of the detection region is collimated by the collecting optic to a light beam consisting of mutually parallel light rays. The detection light emanating from the detection site lying precisely at the intersection point of the optical axis and the measuring plane is collimated by the collecting optic to a parallel beam (consisting of mutually parallel light rays) extending exactly parallel to the optical axis of the detection ray path. The light beam consists of a parallel beam for each individual detection site within the detection region, different detection sites of the detection region having parallel beams slightly inclined relative to each other. The collimating of the detection light to the parallel beam can be achieved by the measuring plane or the detection region lying in the focal plane of the common collecting lens. By the collecting optic converting the detection light to a parallel beam extending parallel to the optical axis, it is achieved that the spectral portions of the detection light can be separated from each other very well upon the division of the light beam into the partial light beams. In comparison therewith, it is disadvantageous when the collecting optic produces no parallel beam but rather a divergent or convergent light beam, because in such cases there is the danger, due to the obliquely extending light rays, of a crosstalk to a false photodetector and thus to a different one of the detected spectral regions.

Preferably, the collecting optic and the detector lenses are arranged in relation to the measuring plane and relative to each other such that the partial light beams emanating from the same detection site of the detection region are respectively parallel in themselves and extend parallel to each other in the portion between the collecting optic and the detector lens. This further avoids a crosstalk to a different one of the detected spectral regions.

The collecting optic and the detector lenses are preferably arranged at such a small space apart along the optical axis of the detection ray path that vignetting errors are avoided upon the imaging of the detection region onto the photo detectors. It is thereby achieved that there is no shadowing of the detection light toward the margin of the detection region and all points of the detection region are imaged onto the photodetector in an equally weighted manner. In particular, the distance between the collecting optic and the detector lenses is for this purpose smaller than the aperture diameter of the collecting optic.

Preferably, the collecting optic, the detector lenses and the photodetectors are arranged with relation to the measuring plane such that the detection region is imaged onto the photodetectors sharply. In particular, the photodetectors of the detection device are so arranged at the focal point of the detector lens associated with the respective photodetector that a sharp imaging of the detection region onto the photodetectors is effected. Because a sharp imaging of the detection region onto the photodetectors is effected, the detection region of the value document is clearly defined and spatially limited. This constitutes an advantage compared with an unsharp detection of the value document and compared with a simple light-guide optic through which the light of the value document is not imaged, but is rather brought without any defined ray path from the light guide onto the photodetector. Because the margin of the detection region is not sharply limited but laterally expanded upon an unsharp imaging of the detection region onto the photodetectors, the photodetectors are over-irradiated with detection light. The advantage of sharp imaging is that successively detected value-document regions of a value document transported past the sensor can be detected without mutual overlap, i.e. separately from each other, even when said regions adjoin each other directly. This makes possible a more exact determination of the local properties of the value document. To achieve a compact construction of the sensor, the detection region is imaged by the collecting optic and the respective detector lens onto the respective photodetector in particular in reduced size.

If the partial light beams are configured as parallel beams, the sharp imaging of the detection region onto each of the photodetectors can be achieved by arranging the photodetectors of the detection device at the focal point of the detector lens associated with the respective photodetector. In the case of slightly divergent or convergent light beams, the sharp imaging is effected outside the focal point of the respective photodetector.

In the case of a sensor configured for checking a value document which, for its check, is transported past the sensor along a transport direction, it is preferred that at least two of the photodetectors of the detection device are arranged offset from each other perpendicularly to the transport direction of the value document and are arranged at the same position, viewed along the transport direction. This allows a more exact value-document check, when the intensities detected by thus arranged photodetectors are correlated with each other for checking a value document. Because measurement deviations which can occur due to fluttering movements of the transported value document have an approximately equally strong effect on the detected intensities of thus arranged photo detectors.

The sensor can have one or several measuring tracks which respectively have one of the above-mentioned detection devices and optionally also respectively one or several light sources. The spectral regions detected in the individual measuring tracks can be identical or different. The light sources of the individual measuring tracks can also be identical or different. However, there can also be employed one or several common light sources for several detection devices of the sensor.

The sensor can have one or several identical or different light sources. In the case of several light sources, these preferably illuminate the same illumination region in the measuring plane. The light sources are preferably arranged before and/or after the detection device, viewed along the transport direction of the value document, the detection region being illuminated in particular obliquely to the optical axis of the detection ray path. This makes it possible to equip the sensor with several measuring tracks transversely to the transport direction, which are at a smaller space apart than it is possible when the arrangement of the light sources is offset perpendicularly to the transport direction. The sensor can have several identical light sources. For example, the same light sources can be arranged in mirror-image form on both sides of the detection device. However, the sensor can have several light sources with different emission spectra whose intensity maxima lie at different wavelengths. In particular, the sensor can have one or several light sources whose emission spectra lie in the ultraviolet spectral region and/or one or several light sources whose emission spectra lie in the visually visible spectral region and/or one or several light sources whose emission spectra lie in the infrared spectral region. As light sources there are preferably used light-irradiating diodes, for example light-emitting diodes (LED), in particular semiconductor light-emitting diodes or organic light-emitting diodes (OLED), and/or laser diodes, in particular vertical-cavity surface emitting lasers (VCSEL).

The detection device is configured for detecting detection light emanating from the illuminated region of the value document upon the check of the value document. The detection light of the value document can be luminescent light of the value document which the illuminated region of the value document emits due to the excitation by the light of the light sources. Alternatively, the detection light can also be remission light or transmission light of the value document. Where applicable, the detection device is additionally also configured for detecting remission or transmission light. For detecting luminescent light, the photodetectors respectively detect a measured value, e.g. for one or several points in time after the end of a light pulse of the illumination, to capture different spectral portions of the detection light.

The photodetectors of the detection device can be controlled by the sensor such that the photodetectors detect the detection light of the detection region in time synchronism with each other. This makes it possible to detect different spectral components of the detection light at the same time. For checking the value document, the light sources and the detectors are operated for example in clocked fashion, the intensity of the luminescent light being detected in several spectral regions in time synchronism with each other at one or several points in time after the end of an illumination pulse of the light source. In the case of luminescence checking, the clocking of the illumination and detection is preferably so fast that the value document is checked quasi-continuously along each of the measuring tracks.

Preferably, the detection device has an additional photodetector for detecting remission light of the value document. The additional photodetector can, analogously to the above-mentioned photodetectors, be arranged laterally offset from the optical axis of the detection ray path. The additional photodetector can also be arranged on the optical axis of the detection ray path, so that the detection light of the value document emitted along the optical axis of the detection ray path is detectable thereby. And along the detection ray path the additional photodetector is preceded by a lens which is arranged between the detection device's detector lenses lying side by side. The additional photodetector can respectively sense a measured value, in synchronism with the illumination by the light sources, to detect the remission light or the transmission light of the illuminated value document. The additional photodetector can be employed as a monitor detector for verifying the light-source intensity and/or perform the function of a light barrier. Preferably, the additional photodetector is directed onto substantially the same detection region of the measuring plane as the above-mentioned photodetectors of the detection device. Thus, the detection light of substantially the same detection region is detectable by the additional photodetector as by the other photodetectors of the detection device. Hence, the sensor can independently detect the location and the arrival time of the edges and of a printed image of the value document. Because the sensor can also detect the remission light of the detection region with the additional photodetector, the sensor can precisely ascertain the location of the detection region on the value document in which luminescent light is detected.

Thus, a more exact association between the detected luminescence signal and the site on the value document can be achieved than would be possible through an additional remission sensor configured separately from the sensor. Thus, a more exact check of the value document is possible.

Preferably, the detection device has at least four of the above-mentioned photodetectors which are arranged side by side such that they form a two-dimensional photodetector array. The center of the photodetector array, in particular the axis of symmetry or the center of symmetry, lies substantially on the optical axis of the detection ray path. The photodetector array can be formed by an orthogonal arrangement of the photodetectors, but it can also be formed by a non-orthogonal arrangement. For example, at least some of the photodetectors can be arranged so as to be distributed concentrically around the center of the photodetector array, preferably at an equal angular distance apart. The at least four photodetectors respectively have associated therewith a detector lens which is arranged along the ray path between the collecting optic and the respective photodetector. The detector lenses are arranged side by side such that the light beam collimated by the common collecting optic is divided by the detector lenses into at least four mutually parallel light beams which are directed by the detector lenses onto the respective photodetector. By the at least four photodetectors the coincident detection region can be detected in four or more spectral regions at the same point in time. Because four or more luminescence intensities can thus be detected independently of each other at the coincident detection site, they can be correlated with each other with high precision.

The measured values sensed by the detection device are subsequently evaluated by an evaluation device which can be part of the sensor or is also formed by an external evaluation device. Preferably, at least a pre-processing of the measured values is already effected by the sensor, in particular by an internal evaluation device of the sensor. The further evaluation can likewise be effected by the internal evaluation device or alternatively by a central evaluation device of the apparatus in which the sensor is installed.

Preferably, there is provided for the sensor a control device adapted to switch the light sources and the photodetectors of the detection device on and off in clocked fashion. The control device can be configured to be a part of the sensor, but it can also be configured as an external control device, e.g. a part of an apparatus for value-document processing in which the sensor is installed. The control device is adapted to control the light sources and the detection device, in particular the photodetectors of the sensor. Upon operation of the sensor, the control device switches the photodetectors on and off in time synchronism with each other. Preferably, the sensor in addition has a housing in which the light sources and the detection device are arranged, optionally also the control device and evaluation device.

In particular, the light sources are configured for exciting luminescent light of the value document, and the photodetectors of the detection device for detecting luminescent light of the value document. Preferably, each of the photodetectors is configured for detecting a different spectral portion of the luminescent light. For example, the spectral regions of the photodetectors are separated from each other such that they do not overlap.

In an embodiment example, the photodetectors have associated therewith different spectral filters which are arranged in the individual detection ray path of the respective photodetector, after the collecting optic and before the respective photodetector. Especially suitable for this purpose are interference filters through which the respectively detected spectral region can be laid on an almost arbitrary wavelength range. In the case of interference filters, the latter are preferably respectively arranged in the ray path of the parallel partial light beam, for example between the collecting optic and the respective detector lens. The transmittance range of the interference filters is spectrally chosen such that the respective interference filter is transmissive to the spectral portion of the detection light to be detected by the respective photodetector. As interference filters there are employed for example band-pass filters. The interference filters of the photodetectors are spectrally chosen such that they transmit only that spectral portion of the detection light which the respective photodetector is to detect, but blocks the other spectral portions of the detection light which are to be detected, where applicable, by one of the other photodetectors. To detect the spectral portions separately from each other, the interference filters of at least two photodetectors are e.g. chosen such that they have a spectral transmittance in opposite directions. The spectral edge of the interference filters, which marks the transition from transmittance to non-transmittance of the interference filter, is then accordingly put between the different spectral portions of the detection light.

To permit different spectral portions, which are spectrally adjacent relatively close to each other, to be separated from each other well, interference filters with great (spectral) edge steepness are preferred. The edge steepness of the interference filters can be stated independently of the wavelength by the relative edge steepness $K=(\lambda_{90}-\lambda_{01})/\lambda_{50}$, wherein with $\lambda_{90}$ or with $\lambda_{50}$ or with $\lambda_{01}$ that wavelength is stated at which the respective interference filter achieves 90% or 50% or 1% of its transmissivity. The relative edge steepness K of the employed interference filters preferably lies at no more than 2%. Preferably, the relative edge steepness K of the employed filters is lower than the relative spectral distance $\Delta\lambda/\lambda$ of the spectral portions which are to be detected in the detection light of the value document by the photodetectors and are to be distinguished from each other, e.g. lower than the relative spectral distance $\Delta\lambda/\lambda$ of two spectral lines to be detected separately from each other. Here, with $\Delta\lambda$ there is stated the spectral distance of the spectral portions or spectral lines to be distinguished and with $\lambda$ the spectral center of the two spectral portions, e.g. the spectral center of the two spectral lines. The relative spectral distance $\Delta\lambda/\lambda$ amounts in particular to at least 4%.

If with two or several of the photodetectors there are used spectral filters with opposite spectral transmittance and such a great edge steepness $K<\Delta\lambda/\lambda$, from the ratio of the intensities detected by the photodetectors there thus arises directly the ratio of the spectral portions, in particular of the spectral lines. With filters having an edge steepness K which corresponds to the relative spectral distance $\Delta\lambda/\lambda$ or is greater, this is not possible because the detected intensities are errored. This results from the fact that the spectral portions—despite their spectral distance—would be detected not only by one but to a certain extent also by another photodetector. Preferably, the relative edge steepness K of the spectral filters is thus lower by at least a factor of 2 than the relative spectral distance $\Delta\lambda/\lambda$ of the spectral portions to be distinguished from each other, in particular than the relative spectral distance $\Delta\lambda/\lambda$ of the spectral lines to be distinguished from each other.

The invention moreover relates to an apparatus for checking value documents which contains one or several of the sensors according to the invention. The apparatus is for example an apparatus for processing value documents, in particular a sorting apparatus for value documents. The apparatus can have a transport system configured for transporting value documents past the sensor in order to successively detect several detection regions of the value document. In the variant in which the value document, for its check, is transported past the sensor at a transport speed, the time interval between illumination pulse and the point in time of detection is preferably so coordinated with the transport speed of the value document that almost exclusively the detection light from the previously illuminated region of the transported value document is detected, in spite of the motion of the value document.

BRIEF DESCRIPTION OF THE DRAWINGS

Hereinafter the invention will be explained by way of example with reference to the following Figures. There are shown.

DETIALED DESCRIPTION OF VARIOUS EMBODIMENTS

Figure 1A:
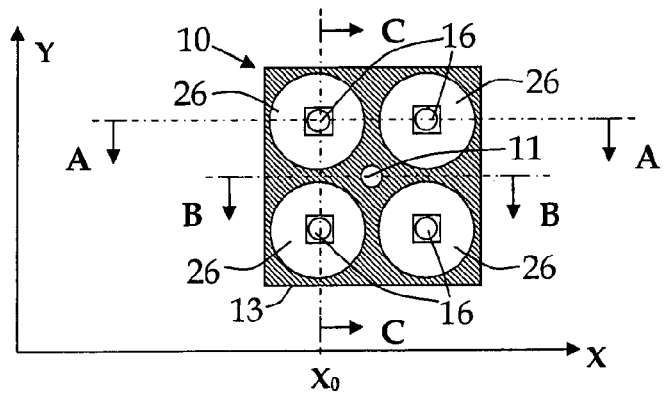
FIG. 1a a detection device of the sensor according to a first embodiment example in a front view, FIG. 1b a section A-A through the detection device of FIG. 1a at the place of two photodetectors, and a section B-B through the detection device of FIG. 1a at the place of the additional photodetector, FIG. 1c a section C-C, extending perpendicularly to section A-A, through the detection device of FIG. 1a at the place of two photodetectors, FIG. 1d the detection device and an illumination device of the sensor in a front view, FIG. 1e a section D-D through the detection device of FIG. 1d at the place of the additional photodetector, FIG. 2 a sensor according to a second embodiment example having a detection device of two photodetectors and an illumination device of the sensor in a front view, FIG. 3 a sensor according to a third embodiment example having a detection device consisting of three photodetectors and two illumination devices of the sensor in a front view, FIG. 4 a front view of a sensor having nine measuring tracks with one detection device and two illumination devices per measuring track, and a value document to be checked.

In the first embodiment example, the sensor is configured for checking the value document in one or several measuring tracks on the value document, for which tracks one detection device 10 is respectively provided. The detection device 10 has four photodetectors 16 arranged as a photodetector array, cf. FIG. 1a. Before each photodetector 16, viewed along the detection ray path, there is respectively arranged a detector lens 26. Like the four photodetectors 16, the four detector lenses 26 are also arranged side by side in a plane. To exclude a crosstalk to a different one of the detected spectral regions through scattered light, the detector lenses are received separately from each other in a mount 13 which consists of a light-non-transmissive material. In the middle of the detection device 10 there is optionally located a GRIN (gradient index) lens 11 in order to direct a portion of the detection light onto an additional photodetector 12, cf. FIG. 1b.

Figure 1B:
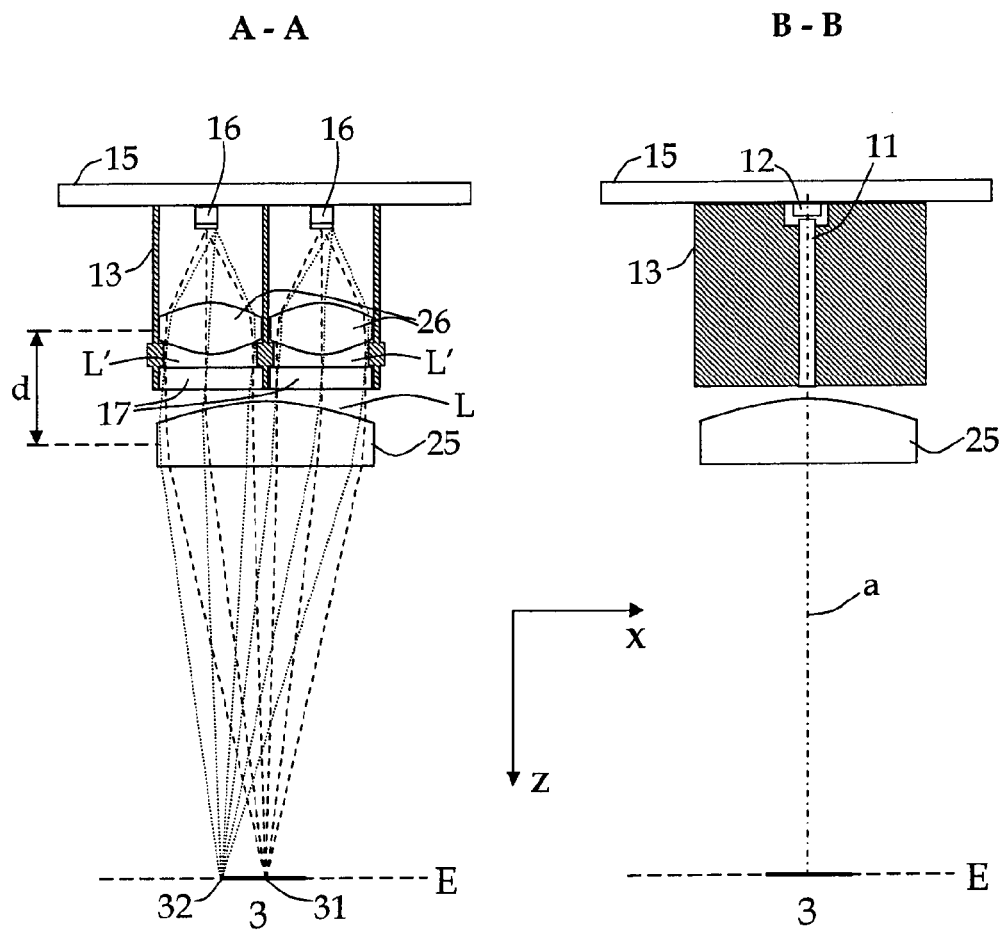

In FIG. 1b there are shown the two sections A-A and B-B through the detection device 10 that are marked in FIG. 1a. In the two sections one can respectively see at the bottom the measuring plane E in which a value document 1 to be checked is arranged, and the detection region 3 lying in the measuring plane E, whose detection light is detected by the detection device 10. The detection light of the detection region 3 is collimated to a light beam L by a collecting lens 25 common to the photodetectors 16. In the upper part of the sections there is respectively represented a carrier 15 on which the additional photodetector 12, the four photodetectors 16 and the mount 13 are fastened. In the left section A-A there are further shown two of the photodetectors 16 received in the mount 13, and the detector lenses 26 associated therewith. Viewed along the detection ray path, there is respectively arranged before each detector lens 26 a spectral filter 17. The filters 17 are transmissive to different spectral regions, so that two different spectral components of the detection light can be detected with the two photodetectors 16. The photodetectors 16 can be e.g. semiconductor photodetectors based on Si, Ge or InGaAs or PbS photodetectors. Within a detection device 10 there can be employed as photodetectors 16 identical or different ones of these detector types.

The light beam L is divided by the arrangement of the four detector lenses 26 into four partial light beams L'. The detection light emanating from the central point 31 of the detection region 3 is converted by the collecting lens 25 to a parallel beam L' extending parallel to the z-axis. The detection light emanating from the margin point 32 of the detection region 3 is converted by the collecting lens 25 to a further parallel beam L' which is slightly inclined relative to the z-axis but which likewise consists of mutually parallel light rays. The geometrical division of the light beam L into the partial light beams L' is such that, apart from the spectral filtering by the filters 17, equally large portions of the detection light impinge on each of the four detection lenses 26 from each of the two points 31 and 32. The intermediate walls of the mount 13 serve as shielding screens between the partial light beams L'. The distance d between the collecting lens 25 and the detector lenses 26 is smaller than the aperture diameter of the collecting lens 25. In this way, the detection light of the same detection region 3 can be detected simultaneously by each of the four photodetectors 16. The light rays shown in FIG. 1b respectively are a projection of the actual light ray onto the x-z plane.

In the right section B-B there is shown the optional additional photodetector 12 which is arranged on the optical axis a of the detection ray path. Through the GRIN lens 11 a portion of the detection light of the detection region 3 can be imaged onto the additional photodetector 12. For example, the additional photodetector 12 detects the remission light of the value document to be checked, which emanates from the detection region 3 during illumination. Along the detection ray path of the additional photodetector 12 there can optionally be arranged a spectral filter in order to detect only a spectral portion of the remission light.

For example, the spectral filters 17 are so chosen that only luminescent light of the value document 1 to be checked is detected by the photodetectors 16. To detect only the luminescent light, there can additionally be contained in the detection ray path a spectral edge filter which is common to all four photodetectors (not shown). The four spectral filters 17 are preferably interference filters which are respectively transmissive to a different spectral component of the luminescent light. The detection device 10 can in this way simultaneously detect the intensities of four different spectral components of the detection light of the same detection region 3 on the value document. The four filters are arranged in this embodiment example between the common collecting lens 25 and the respective detector lens 26. Alternatively, the spectral filters 17 can be arranged between the respective detector lens 26 and the respective photodetector 16. Or the different spectral filters can be formed by the detector lens 26 itself. Additionally or alternatively to the filters 17, the photodetectors 16 can have different spectral sensitivity.

Figure 1C:
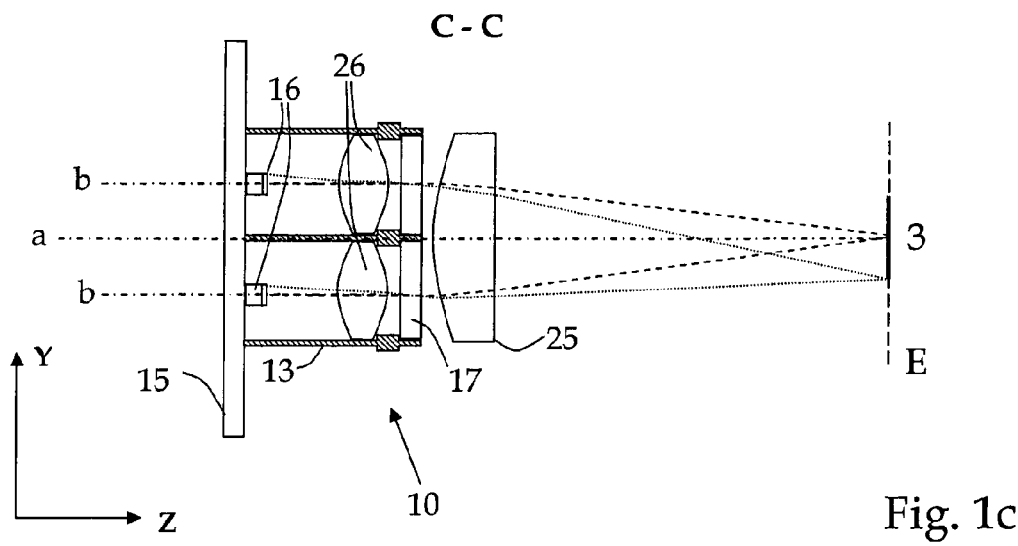

FIG. 1c shows the section C-C through the detection device 10, marked in FIG. 1a, which extends perpendicularly to the section A-A through one of the photodetectors 16. The two photodetectors 16 through which the section C-C extends are arranged offset from each other perpendicularly to the transport direction x of the value document and arranged at the same position $x_0$, viewed along the transport direction x, cf. FIG. 1a. For simplifying the representation, there is respectively shown in FIG. 1c for two points of the detection region 3 only that light ray of the detection light that forms the middle light ray of the partial light beam '. Analogously to FIG. 1b, the shown light rays respectively are a projection of the actual light ray onto the y-z plane. The optical axes b of the detector lenses 26 are oriented parallel to the optical axis a of the detection ray path, and the photodetectors 16 lie on the optical axis b of the respective detector lens 26.

Figure 1D:
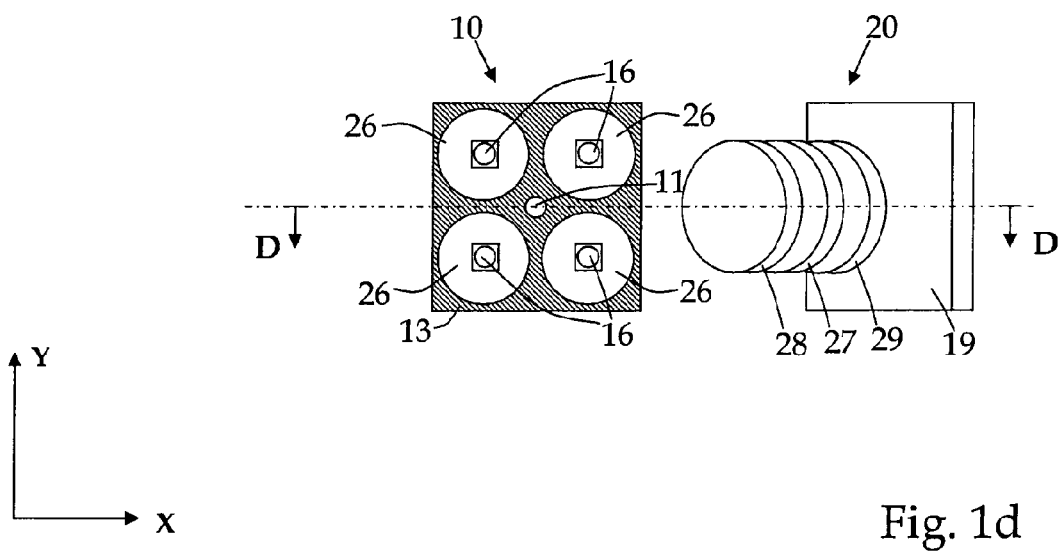
Figure 1E:
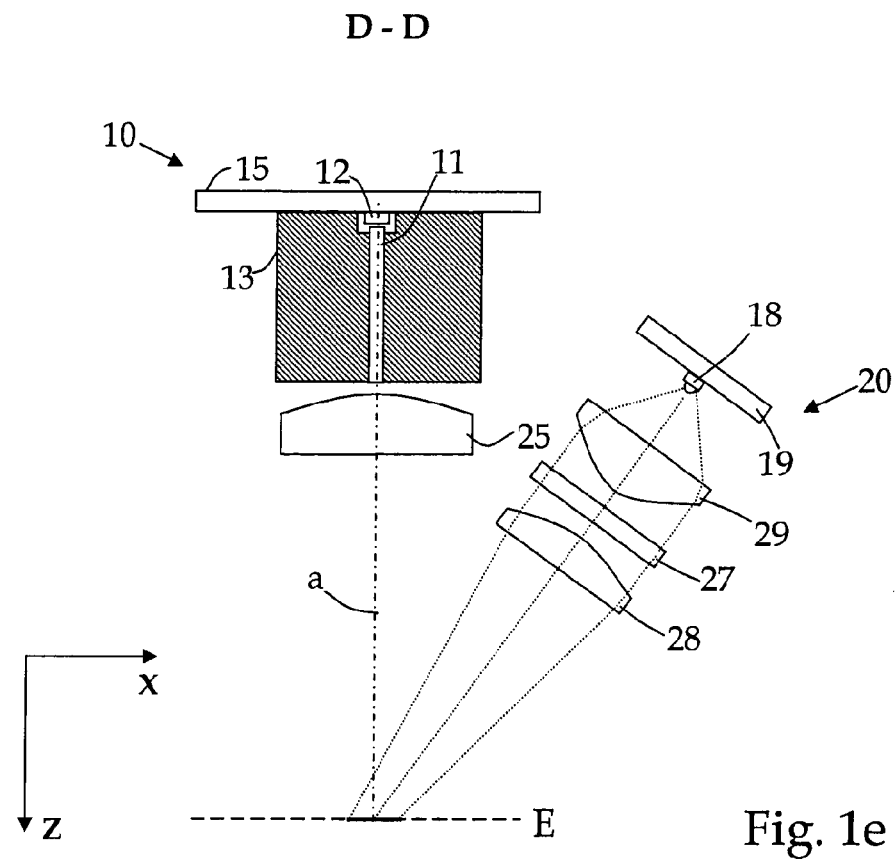

In FIG. 1d there is shown a front view of the sensor parallel to the z-axis as seen from the detection region 3, the collecting lens 25 being omitted for simplifying the representation. Beside the detection device 10 there is arranged an illumination device 20 which is employed for illuminating the detection region 3. The illumination device illuminates e.g. an illumination region in the measuring plane E, the location and extension of said region approximately coinciding with that of the detection region 3. The illumination device 20 has a light source 18 fastened on a carrier 19, cf. FIG. 1e (light source 18 not being visible in FIG. 1d) whose emission light is directed onto the value document 1 using an illumination optic. The illumination optic consists e.g. of two lenses 28, 29 and an interjacent spectral filter 27 which passes only that spectral portion of the emission light of the light source that is desired for illuminating the value document. In FIG. 1e there is represented the section D-D marked in FIG. 1d, in which the light source 18 is visible and which also indicates the illumination ray path.

Figure 2:
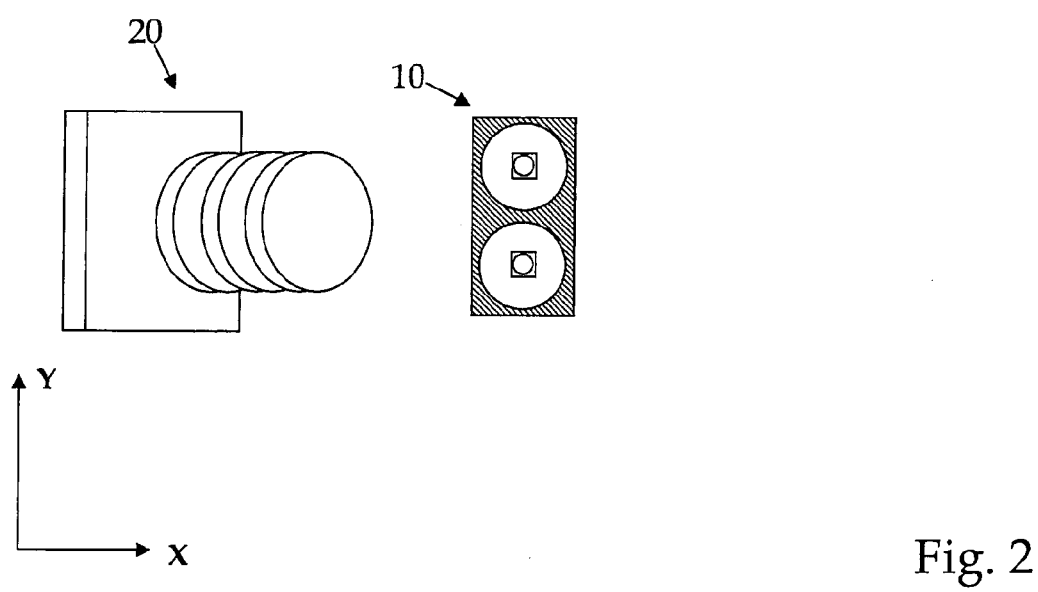
Figure 3:
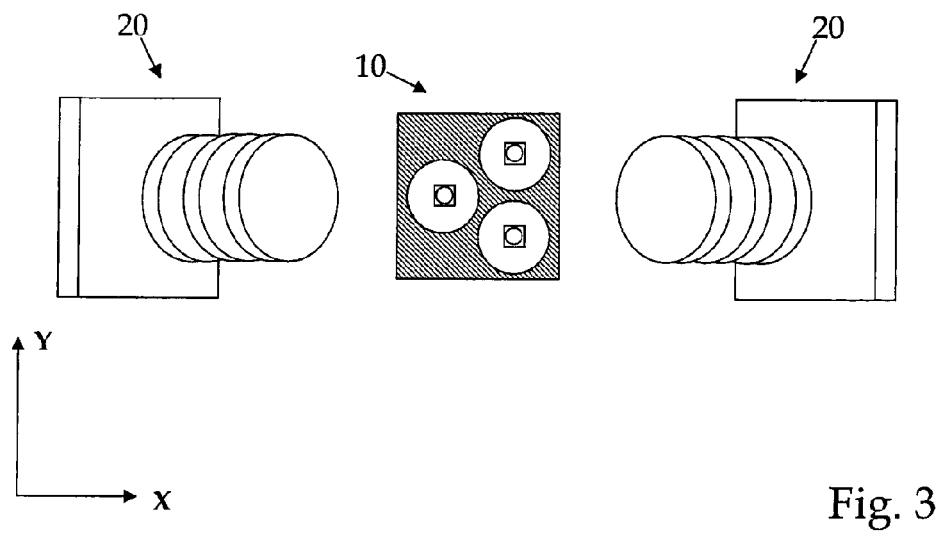

In FIGS. 2 and 3 there are shown two further embodiment examples of the sensor in a front view parallel to the z-axis. Only one measuring track is respectively represented, but the sensor can also have more than one of the represented measuring tracks. In these embodiment examples as well, the photodetectors 16 of each detection device 10 have a common collecting lens (not shown). The detection devices 10 of these embodiment examples can optionally have an additional photodetector for detecting remission light. The measuring track represented in FIG. 2 has an illumination device 20 and a detection device 10 which contains only two photodetectors 16 respectively preceded by a lens 26. The measuring track represented in FIG. 3 has two illumination devices 20 and a detection device 10 which contains three photodetectors 16 respectively preceded by a lens 26.

Figure 4:
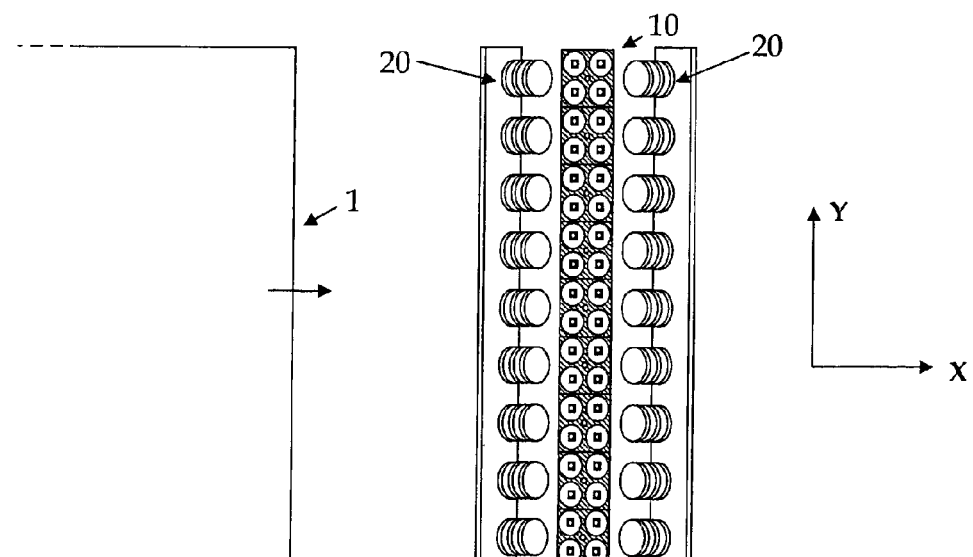

FIG. 4 shows a fourth embodiment example of the sensor in a front view parallel to the z-axis as seen from the detection region 3, the collecting lenses 25 being omitted for simplifying the representation. The sensor has nine measuring tracks which respectively consist of a detection device 10 and two illumination devices 20 arranged on both sides beside the detection device 10. The photodetectors 16, the spectral filters 17, 27 and the light sources 18 of the individual measuring tracks can be identical or of different type. For checking a value document 1, the value document 1 to be checked is transported past the sensor along the transport direction x. During transport, the detection light of the value document 1 emanating from the respective detection region 3 is detected at several points in time, e.g. to scan the value document along the nine measuring tracks.

The invention claimed is:

1. A sensor for checking a value document which, for the check of the value document, is present in a measuring plane of the sensor, comprising:
    at least one light source through which a value document present in the measuring plane (E) can be illuminated in a region of the measuring plane, a detection device having at least two photodetectors arranged side by side for detecting detection light which, upon the check of the value document, emanates from the value document in a detection region of the measuring plane (E) due to the illumination with the light source, wherein the detection light of the value document is detectable by the photodetectors in at least two different spectral regions, a collecting optic common to the photodetectors, through which the detection light emitted by the value document in the detection region can be collected and collimated to a light beam (L), wherein the photodetectors are arranged after the collecting optic, viewed along the optical axis (a) of a detection ray path, wherein each of the photodetectors has associated therewith a detector lens which is arranged after the collecting optic and before the respective photodetector, viewed along the optical axis (a) of the detection ray path, the detector lenses are arranged side by side such that each detector lens receives a partial light beam (L') of the light beam (L) collimated by the collecting optic and directs it onto the respective photodetector, so that the detection region whose detection light is detectable at the same point in time by the photodetectors substantially coincides for the different photodetectors, and the light beam collimated by the collecting optic is divided laterally by the detector lenses.

2. The sensor according to claim 1, wherein the collecting optic is arranged such that the detection light of the value document emitted by each detection site of the detection region is collimated by the collecting optic to a light beam (L) consisting of mutually parallel light rays.

3. The sensor according to claim 1, wherein the collecting optic and the detector lenses are arranged in relation to the measuring plane (E) and to each other such that the partial light beams (L') emanating from the same detection site of the detection region are respectively parallel in themselves and extend mutually parallel in the portion between the collecting optic and the detector lens.

4. The sensor according to claim 1, wherein the optical axes (b) of the detector lenses are respectively arranged outside the optical axis (a) of the detection ray path such that the collimated light beam (L) is divided laterally by the detector lenses into at least two partial light beams (L'), wherein the optical axes (b) of the detector lenses preferably are at the same lateral distance from the optical axis (a) of the detection ray path.

5. The sensor according to claim 1, wherein the collecting optic and the detector lenses are arranged along the optical axis (a) of the detection ray path at such a small space apart that vignetting errors are avoided.

6. The sensor according to claim 1, wherein the collecting optic, the detector lenses and the photodetectors are arranged with relation to the measuring plane (E) such that the detection region is imaged sharply onto the photodetectors, preferably onto each of the photodetectors.

7. The sensor according to claim 1, wherein the photodetectors are arranged on the optical axis (b) of the detector lens associated with the respective photodetector.

8. The sensor according to claim 1, wherein the sensor is configured for checking a value document which, for its check, is transported past the sensor along a transport direction (x), and that at least two of the photodetectors of the detection device are arranged offset from each other perpendicularly to the transport direction of the value document, but at the same position ($x_0$), viewed along the transport direction (x).

9. The sensor according to claim 1, wherein the photodetectors are controlled by the sensor such that the photodetectors detect the detection light of the detection region in time synchronism with each other.

10. The sensor according to claim 1, wherein the photodetectors are configured for detecting different spectral portions of luminescent light of the value document.

11. The sensor according to claim 1, wherein the photodetectors have associated therewith different spectral filters which are respectively arranged in an individual detection ray path of the photodetector.

12. The sensor according to claim 1, wherein the detection device has an additional photodetector for detecting remission light of the value document, which is preferably directed onto substantially the same detection region as the above-mentioned photodetectors of the detection device.

13. The sensor according to claim 1, wherein the detector lenses are single lenses configured to be separate from each other which are preferably arranged coplanarly with each other.

14. The sensor according to claim 1, wherein the detection device has at least four of the photodetectors which are arranged side by side such that they form a two-dimensional photodetector array whose center lies on the optical axis (a) of the detection ray path.

15. An apparatus for checking value documents having one or several sensors according to claim 1.

* * * * *